United States Patent Office 3,285,884

Patented Nov. 15, 1966

3,285,884

CURED NORMALLY SOLID POLYMERS OF ALPHA-OLEFINS AND THEIR PREPARATION

Rudolph S. Wilsher, Kendall Park, N.J., assignor, by mesne assignments, to Mobil Oil Corporation, a corporation of New York No Drawing. Filed Sept. 23, 1963, Ser. No. 310,921
22 Claims. (Cl. 260—79.5)

This invention relates to a method for curing (i.e., cross-linking) normally solid polymers and copolymers of α-olefins and to the cured products obtained thereby. More particularly, this invention relates to a novel method for curing normally solid polypropylene and the cured product thereof.

In accordance with this invention, a normally solid polymer or copolymer of an alpha-olefin is cured by heating, at an elevated temperature, a composition comprising the polymer to be cured in mixture with a small amount, based on the weight of the polymer, of sulfur and a halomethyl substituted aromatic as the curing agent. In more specific embodiment, the invention is carried out by heating a mixture comprising 100 parts by weight of a polymer or copolymer to be cured, from about 1 to about 10 parts by weight of a halomethyl substituted aromatic and sulfur in an amount up to about one half the weight of the curing agent.

Still more specifically, and although the amount of the halomethyl substituted aromatic curing agent that is used will depend on the particular halomethyl substituted aromatic and polymer or copolymer to be cured, a more preferred mixture to be cured contains from about 3 to about 6 parts by weight of the curing agent per 100 parts by weight of the polymer or copolymer. The proportion of sulfur in the mixture will also depend on the particular curing agent and polymer or copolymer employed with the preferred proportion generally being less than half the weight of that of the curing agent and, generally, from about 0.5 to about 3 parts by weight per 100 parts by weight of the polymer or copolymer.

In a particular embodiment of the present invention, the polymer or copolymer to be cured is ground and slurried with the curing agent and sulfur in an organic liquid, suitable examples of which include acetone, diethyl ether, and others, with the compounding being accomplished by evaporating the solvent. Thereafter the composite is dried at about 200–250° F. The polymeric composition can then be cured by heating at an elevated temperature, as for example, from about 275 to about 425° F., and more specifically, from about 325 to about 400° F. for a length of time sufficient to allow adequate curing, usually for at least about 3 minutes and, generally, from about 5 to about 60 minutes.

The above-described method is suitable for a small-scale application of the method of the present invention. The present method, however, may be applied similarly in a larger scale. In such an application the compounding is achieved on conventional roller mills or in internal mixers such as a Banbury, Koneader or screw extruders, particularly the twin screw extruder, and the like. In all cases the final temperature of the batch should be as low as practicable, preferably exceeding only slightly the melting point of the polymer. Although maximum temperatures of the order of about 425–450° F. are encountered in the mixing cycle, preferably the mixer employed discharges the compound at a temperature considerably lower. Significantly, many of the above internal mixers are particularly effective in dispersing the compounding ingredients. Consequently, in such a process, the mixing time would be frequently shortened to about 3–5 minutes and would rarely exceed 5–10 minutes.

The present invention is especially applicable to the curing of polypropylene and, hence, the invention is described herein with particular emphasis on polypropylene. However, it is also applicable to the curing of other polymers or copolymers of alpha-olefins, for example, polymers or copolymers obtained from one, two or more of the following olefins; ethylene, propylene, 1-butene, 1-pentene, 4-methyl-1-pentene, 5-methyl-1-hexene, 4-ethyl-1-pentene, and, in general, other alpha-olefins containing up to 10 carbon atoms. In reference to copolymers, it is preferred that one of the olefins from which the copolymer is obtained be ethylene or propylene. Additionally, the invention is applicable to the curing of a broad spectrum of copolymer compositions including terpolymers and higher combinations. In commercial practice with polymers of particularly beneficial utility, the copolymers most frequently comprise ethylene, propylene, 1-butene or combinations thereof. With more difficulty, the invention is also applicable to the curing of a copolymer of one of the above-mentioned alpha-olefins and another olefin having a double bond which is not in the alpha position. Examples of such other olefins include the following: 2-butene, 2-pentene, 2-hexene, 3-hexene, and others.

The halomethyl substituted aromatics useful for the practice of the present invention have the following formula:

$$R(CH_2X)_n$$

wherein X is a halogen atom, examples of which include chlorine or bromine, but preferably chlorine; and wherein R is an aromatic group such as a phenyl or aryl, and preferably a phenyl, and which hydrocarbon group may have substituted thereon one or more alkyl groups, such as methyl, ethyl, propyl, butyl, etc., and isomers thereof; and wherein $n$ is any integer from 2 to 6 or above, and preferably 2. Specific examples of useful halomethyl substituted aromatics are α,α′-xylylene dichloride, α,α′-xylylene dibromide, α,α′,α″-trichlorotrimethylbenzene, α,α′,α″,α‴-tetrachlorodurene, and others.

By the method of the present invention, polymers or copolymers of alpha-olefins can be cured to give products having a high tensile strength, e.g., from about 4000–5300 p.s.i. at yield, an elongation at break of about 10–500% or more, while exhibiting excellent chemical inertness.

The following examples set forth embodiments of the invention for purposes of illustration and not limitation.

*Example*

(A) In this example, polypropylene, α,α′-xylylene dichloride (XDC) and sulfur were combined according to the following formulas (all parts being by weight):

| | A | B |
|---|---|---|
| Polypropylene | 100 | 100 |
| XDC | 3 | 5.8 |
| Sulfur | 1 | 1 |

Slabs of the composition of Formula A were cured at various temperatures for varying periods of time. The physical properties of the various products were evaluated and the results are given below:

| | A-1 | A-2 | A-3 | A-4 | A-5 | A-6 | A-7 | A-8 | A-9 | A-10 | A-11 | A-12 |
|---|---|---|---|---|---|---|---|---|---|---|---|---|
| Curing temperature, ° F | 325 | 325 | 325 | 325 | 335 | 335 | 335 | 335 | 345 | 345 | 345 | 345 |
| Curing time, minutes | 5 | 10 | 20 | 30 | 5 | 10 | 20 | 30 | 5 | 10 | 20 | 30 |
| Tensile strength, p.s.i.: | | | | | | | | | | | | |
| Yield | 5,100 | 5,150 | 5,260 | 5,175 | 4,445 | 4,180 | 4,075 | 4,100 | 4,460 | 4,410 | 4,270 | 4,270 |
| Break | ---------- | ---------- | ---------- | ---------- | 4,155 | 4,565 | 4,515 | 4,265 | 4,770 | 4,750 | 4,860 | 4,695 |
| Tensile modulus, p.s.i | 200,500 | 214,500 | 206,000 | 202,500 | 182,000 | 173,000 | 156,500 | 173,500 | 173,000 | 180,500 | 177,500 | 168,500 |
| Elongation, percent | 10.8 | 13.2 | 9.5 | 8.1 | >431 | >707 | >756 | >701 | >698 | >711 | >757 | >757 |
| Gel, percent | 59.1 | 80.0 | 86.8 | 82.9 | 77.8 | 92.6 | 63.3 | 83.3 | 91.2 | 70.7 | 65.8 | 92.1 |

Tensile strength, tensile modulus and elongation values are average of duplicate determinations made on "Die C" specimens with a model TM Instron at a cross-head speed of 0.2 inch/min. Tensile testing was carried out according to ASTM D-638-58T. Gel values are single determinations of the weight per cent of cured polymer remaining after extraction for 24 hours with boiling tetrachloroethylene in a Soxhlet extractor.

(B) Slabs of the composition of Formula B were cured for 5 minutes at various temperatures. The physical properties of the various products were evaluated and the results are given below:

| | B-1 | B-2 | B-3 | B-4 | B-5 |
|---|---|---|---|---|---|
| Curing temperature, ° F | 335 | 350 | 365 | 380 | 395 |
| Tensile strength, p.s.i.: | | | | | |
| Yield | 4,265 | 4,135 | 4,695 | 4,605 | 4,280 |
| Break | 4,440 | 4,640 | 3,415 | 4,300 | ---------- |
| Tensile modulus, p.s.i | 171,500 | 168,500 | 187,500 | 180,500 | 169,000 |
| Elongation, percent | 348 | >760 | 182 | 652 | 757 |
| Gel, percent | 68.7 | 69.3 | ---------- | 79.6 | 81.3 |

The above results clearly illustrate that a polymer of an alpha olefin, exemplified by propylene, compounded with a halomethyl substituted aromatic can be effectively cured to give a cross-linked product which exhibits superior strength, ductility and chemical inertness.

Although the present invention has been described with preferred embodiments, it is to be understood that modofications and variations may be resorted to, without departing from the spirit and scope of this invention, as those skilled in the art will readily understand. Such variations and modifications are considered to be within the purview and scope of the appended claims.

What is claimed is:

1. A method for curing normally solid polymers of an alpha-olefin which comprises heating a normally solid polymer of an alpha-olefin, blended with a small amount, based on the weight of said polymer, of a halomethyl substituted aromatic as a curing agent, and sulfur in an amount by weight less than that of said curing agent, at a temperature above the melting point of said blend, for a period of time sufficient to cross-link said polymer.

2. A method as defined in claim 1 in which the blend by weight contains from about 0.01 to about 0.1 part of the halomethyl substituted aromatic per part of the polymer, and sulfur in an amount up to about ½ the weight of the halomethyl substituted aromatic.

3. A method as defined in claim 1 wherein the blend is heated at a temperature of from about 275° F. to about 425° F. for at least 3 minutes.

4. A method as defined in claim 1 wherein the blend by weight contains from about 0.01 to about 0.1 part of the halomethyl substituted aromatic per part of the polymer, and sulfur in an amount up to about ½ the weight of the halomethyl substituted aromatic, and wherein the blend is heated at a temperature of from about 275° F. to about 425° F. for at least 3 minutes.

5. A method as defined in claim 1 wherein the normally solid polymer is polypropylene.

6. A method as defined in claim 1 wherein the normally solid polymer is a copolymer of two or more different alpha-olefins.

7. A method as defined in claim 1 wherein the normally solid polymer is a copolymer of an alpha-olefin and an olefin unsaturated other than in the alpha position.

8. A method as defined in the claim 1 wherein the halomethyl substituted aromatic has the following structure:

$$R(CH_2X)_n$$

in which X is a halogen atom, $n$ is an integer and R is an aromatic radical.

9. A method as defined in claim 8 wherein X is a chlorine atom.

10. A method as defined in claim 8 wherein R is a phenyl group.

11. A method as defined in claim 8 wherein $n$ is an integer of the group consisting of 2, 3, 4, 5 and 6.

12. A method as defined in claim 1 wherein the halomethyl substituted aromatic curing agent is $\alpha,\alpha'$-xylylene dichloride.

13. A composition, useful in the preparation of cured polymers of alpha-olefins, comprising a normally solid polymer of an alpha-olefin, blended with a small amount, based on the weight of said polymer, of a halomethyl substituted aromatic as a curing agent, and sulfur in an amount by weight less than that of said curing agent.

14. A composition, useful in the preparation of cured polymers of alpha-olefins, comprising a blend as defined in claim 13 which contains by weight from about 0.01 to about 0.1 part of said halomethyl substituted aromatic per part of said polymer, and sulfur in an amount up to about ½ the weight of said halomethyl substituted aromatic.

15. A composition, useful in the preparation of cured polymers of alpha-olefins, comprising a blend as defined in claim 13 wherein the normally solid polymer is polypropylene.

16. A composition, useful in the preparation of cured polymers of alpha-olefins, comprising a blend as defined in claim 13 wherein the normally solid polymer is a copolymer of two or more different alpha-olefins.

17. A composition, useful in the preparation of cured polymers of alpha-olefins, comprising a blend as defined in claim 13 wherein the normally solid polymer is a copolymer of an alpha-olefin and an olefin unsaturated other than in the alpha position.

18. A composition, useful in the preparation of cured polymers of alpha-olefins, comprising a blend as defined in claim 13 wherein the halomethyl substituted aromatic has the following structure:

$$R(CH_2X)_n$$

in which X is a halogen atom, $n$ is an integer and R is an aromatic hydrocarbon radical.

19. A composition, useful in the preparation of cured polymers of alpha-olefins, comprising a blend as defined in claim 18 wherein X is a chlorine atom.

20. A composition, useful in the preparation of cured polymers of alpha-olefins, comprising a blend as defined in claim 18 wherein R is a phenyl group.

21. A composition, useful in the preparation of cured polymers of alpha-olefins, comprising a blend as defined in claim 18 wherein $n$ is an integer of the group consisting of 2, 3, 4, 5 and 6.

22. A composition, useful in the preparation of cured polymers of alpha-olefins, comprising a blend as defined in claim 13 wherein the halomethyl substituted aromatic curing agent is $\alpha,\alpha'$-xylylene dichloride.

References Cited by the Examiner

UNITED STATES PATENTS

| | | | |
|---|---|---|---|
| 2,890,187 | 6/1959 | Bowman et al. | 260—79.5 |
| 2,920,062 | 1/1960 | McFarland | 260—79.5 |
| 2,983,714 | 5/1961 | Robinson et al. | 260—79.5 |
| 3,047,552 | 7/1962 | Reynolds et al. | 260—94.9 |

JOSEPH L. SCHOFER, *Primary Examiner.*

L. EDELMAN, *Assistant Examiner.*